(No Model.)

H. J. LA FORCE.
PNEUMATIC TIRE.

No. 588,680.  Patented Aug. 24, 1897.

WITNESSES:
William H. James.
Alfred K. Broad.

INVENTOR.
Hippolyte Joseph La Force.
per Hubert W. T. Jenner.
Attorney.

THE NORRIS PETERS CO., PHOTO-LITHO., WASHINGTON, D. C.

UNITED STATES PATENT OFFICE.

HIPPOLYTE JOSEPH LA FORCE, OF PARIS, FRANCE.

PNEUMATIC TIRE.

SPECIFICATION forming part of Letters Patent No. 588,680, dated August 24, 1897.

Application filed May 17, 1897. Serial No. 636,894. (No model.) Patented in Canada December 2, 1891, No. 27,890; in England September 8, 1892, No. 16,095, and in France September 8, 1892, No. 224,227.

*To all whom it may concern:*

Be it known that I, HIPPOLYTE JOSEPH LA FORCE, a citizen of Canada, temporarily residing at Paris, in the Republic of France, have invented certain new and useful Improvements in Pneumatic Tires; and I do hereby declare the following to be a full, clear, and exact description of the invention, such as will enable others skilled in the art to which it appertains to make and use the same.

Letters Patent have been obtained for this invention in the following countries: Canada, No. 27,890, dated December 2, 1891; England, No. 16,095, dated September 8, 1892, and France, No. 224,227, dated September 8, 1892.

The invention relates to pneumatic tires for cycles and other road-vehicles; and it consists in the novel construction and combination of parts hereinafter fully described and claimed.

Figure 1:
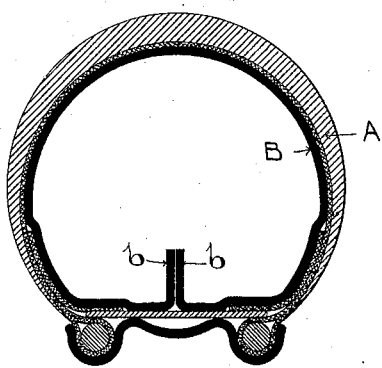
Figure 2:
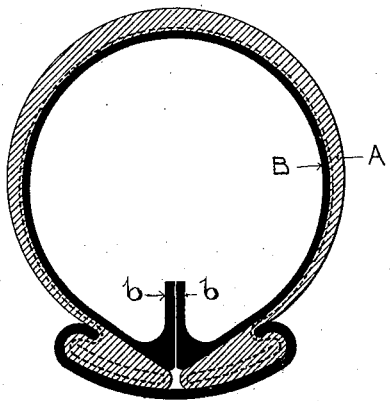

In the drawings, Figure 1 is a view in transverse section of a tire constructed according to this invention; and Fig. 2 is a similar view showing a modification.

In both views similar letters of reference denote like parts.

The tire consists of two essential parts—an outer or wearing part A, which is constructed of rubber reinforced with canvas or other fabric in the well-known manner, and an inner or lining part B, which is formed of rubber or other suitable material.

The outer part A, which is adapted to be fixed to the wheel-rim by any suitable device, examples of which are shown in the drawings, is made in the form of an open tube—that is, it is divided circumferentially along its inner or under side.

The inner part B, which is also made in the form of an open tube, may either be made from a strip of rubber or like material having its edges folded to form inwardly-projecting lips *b*, or it may be molded to such a shape. The lips *b* bear against each other to form an air-tight joint, which is intensified on inflation by the pressure of air within the tire. To insure an initial air-tight joint before inflation is commenced and to insure the lips retaining their positions with respect to one another when mounting the tire in the wheel-rim, the said lips may be held together by any suitable adhesive material, such as rubber cement. I prefer, however, to use a semiplastic cement sufficiently adhesive to insure the lips adhering together until the air-pressure acts on them, but not so tenacious as to prevent the lips being readily pulled apart when it is desired to obtain access to the interior for the purpose of repair.

The lining B is carefully cemented or otherwise fixed to the inner side of the outer part A by means of rubber solution or other suitable adhesive material, so that the two parts become integral on that part liable to be punctured.

By this construction the repair of a puncture is an easy matter, as no difficulty arises either in finding the hole or in putting a patch over it. In case of puncture the hole is located by ascertaining where the air is escaping on the outside of the tire. The spot having been marked, one edge of the tire is removed from the wheel-rim and the edges of the lining pulled apart immediately behind the puncture. A patch of rubber or other suitable material having been fixed on the interior of the tire over the hole, the edges of the lining are brought together again, the free edge of the tire replaced in the wheel-rim, and the tire inflated, when the pressure of air acts both to keep the divided edges of the lining B closed and the repairing-patch in place on the interior surface of the tire.

What I claim is—

1. In a pneumatic tire, the combination with an outer or wearing part of an open tubular form, of an inner or lining part also of an open tubular form and having internal sealing-lips, the said inner or lining part being cemented or otherwise fixed to the interior of the outer or wearing part, substantially as set forth.

2. In a pneumatic tire, the combination with an outer part or cover of an open tubular form and having its edges adapted to be fixed in the wheel-rim, of an inner or lining part divided circumferentially on its inner or under side and provided with inwardly-projecting lips which are pressed into air-tight contact when the tire is inflated, the outer periphery of the said inner tube or lining being secured to the outer part or cover so that they become integral on that part forming the tread, substantially as set forth.

3. An air-tube for a pneumatic tire divided circumferentially on its inner or under side and provided with inwardly-projecting lips which are pressed into air-tight contact when the tube is inflated, substantially as and for the purpose set forth.

In testimony whereof I affix my signature in presence of two witnesses.

HIPPOLYTE JOSEPH LA FORCE.

Witnesses:
EDWARD P. MACLEAN,
PAUL F. PAQUET.